United States Patent [19]
Bainbridge et al.

[11] 3,891,241
[45] June 24, 1975

[54] VEHICLE SUSPENSION SYSTEMS

[75] Inventors: Wilfred Nicholas Bainbridge; David Parsons, both of Warwickshire, England

[73] Assignee: Automotive Products Co., Ltd., Leamington SPA, England

[22] Filed: Feb. 20, 1973

[21] Appl. No.: 333,627

[30] Foreign Application Priority Data
Feb. 21, 1972 United Kingdom............... 7921/72

[52] U.S. Cl. .............................. 280/124 F; 280/6 H
[51] Int. Cl................................................. B60g 11/26
[58] Field of Search ........................ 280/124 F, 6 H

[56] References Cited
UNITED STATES PATENTS
3,065,976  11/1962  Vogel.............................. 280/124 F
3,592,484  7/1971  Burke.............................. 280/124 F

*Primary Examiner*—Philip Goodman
*Attorney, Agent, or Firm*—Lawrence J. Winter

[57] ABSTRACT

A suspension system includes a control valve which controls liquid pressure within two telescopic struts so that the body is kept at a substantially constant height. Normally the control valve returns the output of an engine driven pump to a reservoir. Liquid is fed by the pump to each strut through a non-return valve. Liquid is drained from each strut by the control valve when the vehicle loading is reduced. Control valve operation is damped so that there is a resistance to the movement of the body away from the desired height whereas the body can move freely towards that position. The control valve may be a spool valve having its spool coupled mechanically to the axle, in which case the damping means comprise non-return valves or plate valves controlling communication between variable volume chambers and the pump output or reservoir. Alternatively the control valve includes a differential area piston and two solenoid valves, one of which operates to move the piston and restrict the return of liquid to the reservoir by the pump, the other solenoid valve being operable to drain the struts. The damping means may comprise electronic apparatus arranged to damp the means for energising the solenoid windings.

11 Claims, 13 Drawing Figures

VEHICLE SUSPENSION SYSTEMS

This invention relates to vehicle suspension systems of the kind which include a telescopic strut comprising one strut element for connection to an axle of the vehicle and another strut element for connection to the body of the vehicle, a source of liquid under pressure and valve means for controlling connection of the interior of the telescopic strut to the source of liquid under pressure or to drain so as to control the length of the strut, the valve means being operable automatically to vary the pressure of liquid within the strut in accordance with changes in the loading of the vehicle so as to maintain the body of the vehicle at a substantially constant height above the ground.

An object of this invention is to provide a vehicle suspension system of the kind referred to which may be independent of any other liquid pressure control system of the vehicle, which does not include hydraulic accumulators or cut-out valves, and which includes a continuously operable liquid pump which is adapted to circulate liquid at low pressure normally.

According to one aspect of this invention there is provided a vehicle suspension system including a telescopic strut comprising one strut element for connection to an axle of the vehicle and another strut element for connection to the body of the vehicle, a liquid reservoir, a liquid pump arranged to draw liquid from the liquid reservoir and to feed it under pressure through a non-return valve to the interior of the telescopic strut, and a control valve operable in the telescopic strut, and a control valve operable in accordance with relative movement between the axle and the body of the vehicle, the control valve, which connects the pump output to the reservoir normally, being arranged to increase the pressure of liquid supplied by the pump to the non-return valve when the loading of the vehicle is increased so that liquid under the increased pressure is fed through the non-return valve to the interior of the telescopic strut and to place the interior of the telescopic strut in communication with the reservoir when the loading of the vehicle is decreased, so that liquid is discharged from the telescopic strut.

According to another aspect of this invention, there is provided a vehicle suspension system including two telescopic struts, each telescopic strut comprising one strut element for connection to a respective axle of the vehicle and another strut element for connection to the body of the vehicle, a liquid reservoir, a liquid pump arranged to draw liquid from the liquid reservoir and to feed it under pressure through one nonreturn valve to the interior of one of the telescopic struts and through another non-return valve to the interior of the other of the telescopic struts, and a control valve operable in accordance with relative movement between an axle and the body of the vehicle, the control valve, which connects the pump output to the reservoir normally, being arranged to increase the pressure of liquid supplied by the pump to the non-return valves when the loading of the vehicle is increased so that liquid under the increased pressure is fed through the non-return valves to the interior of the telescopic struts, and to place the interior of the telescopic struts in communication with the reservoir when the loading of the vehicle is decreased, so that liquid is discharged from the telescopic struts.

Preferably damping means are provided for damping control valve operating signals induced by movement of the respective axle relative to the vehicle body due to road surface variations so that the control valve is not operated to feed liquid to the or each telescopic strut or to drain liquid from the or each telescopic strut in accordance with such axle movement. The damping means may be arranged so that the degree of damping provided when the respective axle moves downwardly from the desired position relative to the vehicle body differs from that provided when the respective axle moves upwardly from the desired position relative to the vehicle body.

Conveniently the pump is arranged to supply liquid to the or each non-return valve through the control valve.

The control valve may comprise a valve member coupled to an axle of the vehicle and movable relative to a valve body which is fixed to the vehicle body, the damping means being incorporated within the control valve and being arranged to damp movement of the valve member away from the normal position in which it connects the pump output to the reservoir, the arrangement being such that return movement of the valve member to the normal position is relatively free. The damping means may be arranged so that return movement of the valve member to the normal position is not damped. Alternatively the damping means may be arranged so that some degree of damping of return movement of the valve member to the normal position is provided.

In one embodiment of this invention the control valve has a valve spool coupled to an axle of the vehicle ans slidable in a bore in the valve body which is fixed to the vehicle body and damping means incorporated in the control valve are provided, the damping means being arranged to damp movement of the valve spool away from the normal position in which it connects pump output to the reservoir, the arrangement being such that return movement of the valve spool to the normal position is relatively free. Conveniently the bore is a through bore and the valve spool is longer than the through bore, each end of the valve spool being fixed to a respective moveable wall, and each movable wall and the adjacent end of the valve body comprising opposite walls of a respective variable volume chamber which is in restricted communication with the reservoir at least when the valve spool is in the said normal position, or is moved theretowards from the said normal position. A pair of non-return valves may be housed within the valve spool in which case an axial passage in the valve spool interconnects the inlet ports of the pair of non-return valves, the outlet port of one of the pair of non-return valves being in communication with one of the variable volume chambers and the outlet port of the other of the pair of non-return valves being in communication with the other variable volume chamber, the axial passage, which is in communication with the reservoir, being isolated from the two variable volume chambers when the valve spool is in the normal position in which it connects pump output to the reservoir, but, when the valve spool is moved from the said normal position towards one of the variable volume chambers, a respective one of two by-pass passages in the valve spool, which each by-pass a respective one of the pair of non-return valves, places the axial passage freely in communication with said one variable volume chamber, the arrangement being such that the displacement of liquid from the other variable volume chamber during movement of the valve spool from the said normal position towards said one variable volume chamber is restricted by the restricted communication between said other variable volume chamber and the reservoir, whilst liquid is displaced freely from said one variable volume chamber through the respective by-pass passage and liquid is introduced freely into said other variable volume chamber through the respective one of said pair of non-return valves during return movement in the opposite direction. In another embodiment of this invention a plate valve member in each variable volume chamber, is held against the valve body when the valve spool is in the said normal position or when the volume of the respective variable volume chamber is being reduced with movement of the valve spool away from the said normal position, each plate valve member having a restricted orifice through which restricted communication between the respective variable volume chamber and the reservoir is established when the plate valve member is held against the valve body, each plate valve member being moved away from the valve body by the valve spool as the valve spool moves from the said normal position towards the respective variable volume chamber so that that variable volume chamber is placed freely in communication with the reservoir.

In another embodiment of this invention the liquid pump output is connected in parallel to the control valve and to the or each non-return valve, the control valve being operable to restrict or interrupt the passage of liquid from the pump to the reservoir when the loading of the vehicle is increased so that the pressure of liquid supplied by the pump to the or each non-return valve is increased. The control valve may be arranged to be actuated by energisation of solenoid windings, the windings being energised by signals from the electronic apparatus which senses relative movement between the axle and the vehicle body. The damping means may be electronic also. The control valve may include a differential piston and a solenoid operated valve which applies pump output pressure to the larger effective area of the piston when opened, pump output pressure normally acting on the smaller effective area of the piston to hold the piston in one position which permits free passage of liquid from the pump to the reservoir, the piston being moved from said one position by the action of pump output pressure on the larger effective area of the piston when the solenoid valve is opened by energisation of its solenoid winding so that the passage of liquid from the pump to the reservoir is restricted or interrupted. The differential piston may comprise a piston portion slidable in a cylindrical chamber and a smaller diameter coaxial plunger portion slidable in a bore in one end wall of the cylindrical chamber, the piston portion normally being held against the other end wall of the cylindrical chamber by the action of pump output pressure on the end of the plunger portion remote from said other end wall. Liquid may be conveyed to the reservoir from the pump output via passage means in said plunger portion and a non-return valve in said piston portion. Both sides of said differential area piston may be in communication one with the other via a restricted orifice. There may be another normally closed solenoid operated valve which connects the interior of the or each telescopic strut to the reservoir when its solenoid winding is energised.

Conveniently the interiors of the two telescopic struts are isolated one from the other by said non-return valves any by valve means connected between the telescopic struts and the control valve in the conduits by which the interiors of the struts are connected to the reservoir. The valve means may comprise two non-return valves or solenoid operated valves. Said non-return valves, said valve means and the other normally closed solenoid valve may be housed in a common valve block.

Where the pump is driven by an engine of the vehicle, liquid fed under pressure by the pump to the control valve may be fed through a flow limiting spill valve which acts to maintain the rate of flow of liquid fed to the control valve substantially constant.

Three embodiments of this invention will be described now by way of example with reference to the accompanying drawings, of which:-

Figure 1:
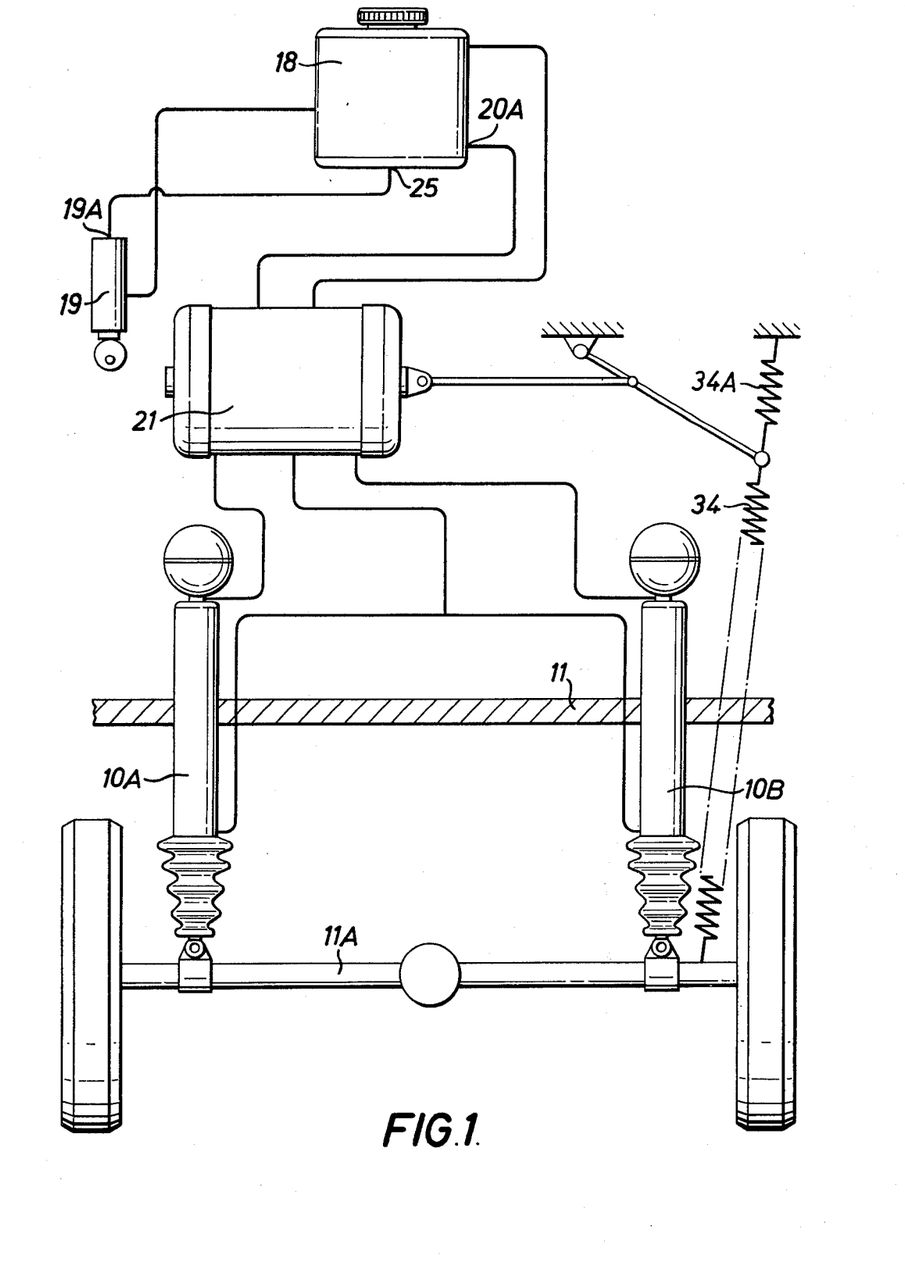
FIG. 1 is a diagram illustrating one form of vehicle suspension system according to this invention.

Referring to FIG. 1, a vehicle suspension system includes two liquid filled struts 10A and 10B and a closed circuit liquid pressure control system which is operable automatically to control the supply and exhaust of liquid from the struts 10A and 10B so that the level of the vehicle body 11 is maintained substantially constant despite variations in the loading of the vehicle.

Figures 2, 3, 10, 11:
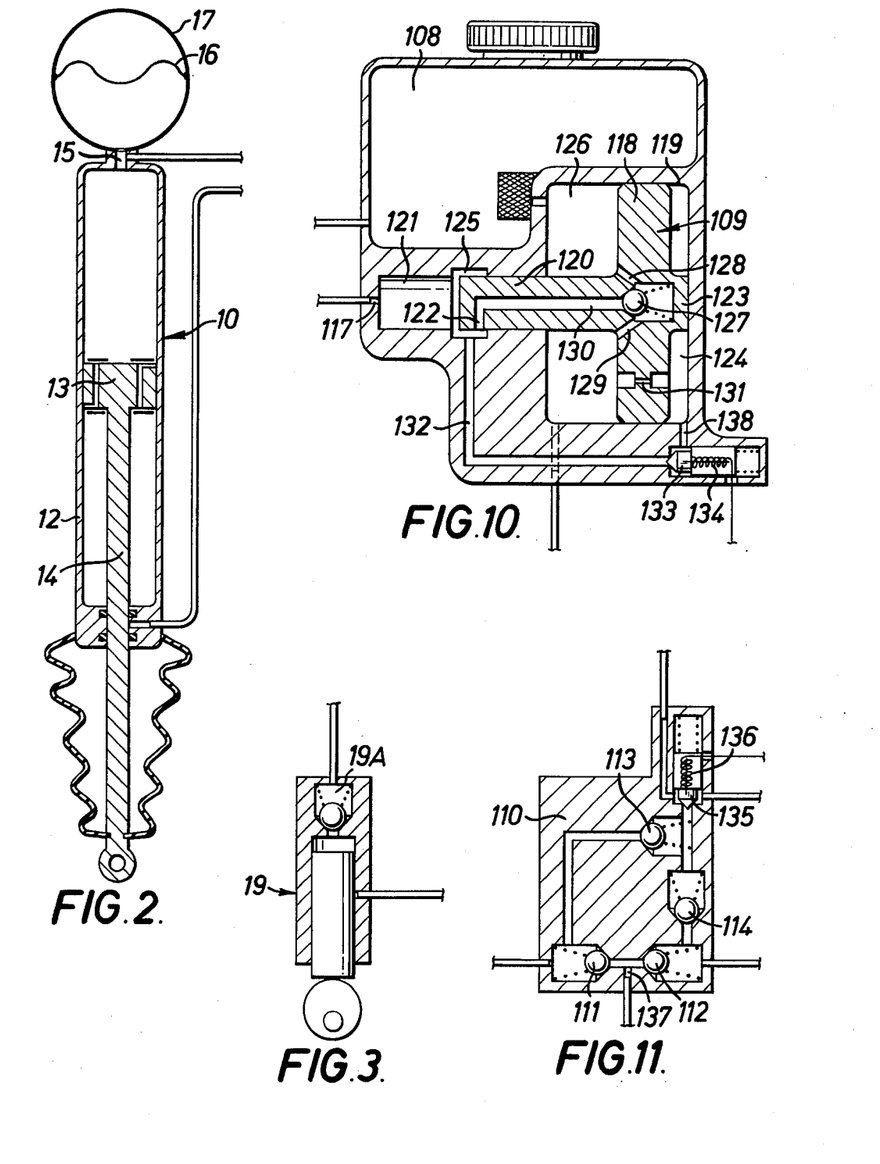
FIG. 2 is a sectional view of a typical suspension strut for a vehicle suspension system according to this invention.
FIG. 3 is a sectional view of a typical engine-driven pump for a vehicle suspension system according to this invention.
FIG. 10 is a sectional view of the reservoir and valve device of the vehicle suspension system illustrated in FIG. 9.
FIG. 11 is a sectional view of the valve block of the vehicle suspension system illustrated in FIG. 9.

Referring now to FIG. 2, each liquid filled strut 10A or 10B comprises a cylinder 12 which is adapted for mounting on the vehicle body 11, a piston 13 which slides within the cylinder 12, and a piston rod 14 which extends from the piston 13 through one end wall of the cylinder 12 for connection outside the cylinder 12 to an axle 11A of the vehicle. The cylinder spaces on each side of the piston 13 are placed in communication with one another via conventional damping valves. The cylinder space on the side of the piston 13 remote from the piston rod 14 is in communication via a port 15 in its cylinder end wall with a space on one side of a diaphragm 16 which extends across the interior of a spherical vessel 17. The space within the spherical vessel 17 on the opposite side of the diaphragm 16 is gas filled.

Figure 4:
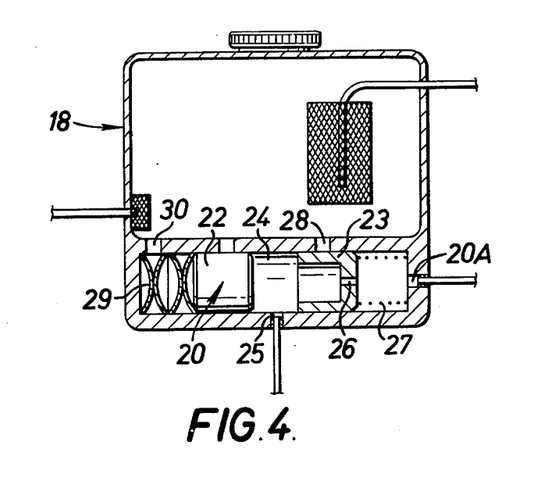
FIG. 4 is a sectional view of the reservoir and combined overload relief and flow limiting valve of the vehicle suspension system illustrated in FIG. 1.
Figure 5:
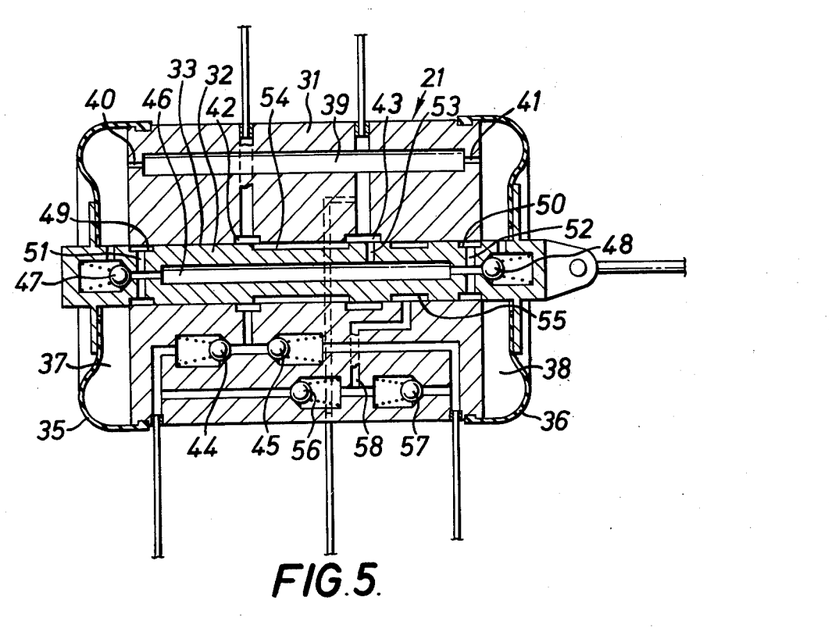
FIG. 5 is a sectional view of the control valve of the vehicle suspension system illustrated in FIG. 1.

Referring again to FIG. 1 together with FIGS. 3–5, the liquid pressure control system has a liquid reservoir 18, a single-cylinder pump 19 for drawing liquid from the reservoir 18 and feeding it under pressure through a combined overload relief and flow limiting spill valve 20 (FIG. 4) to a suspension control valve 21. The pump 19 is driven by the engine of the vehicle.

The combined overload relief and flow limiting spill valve 20 comprises a plunger 22 and a cupshaped flow limiting valve member 23 which are slidable in a bore 24 in the housing of the reservoir 18. The pump output 19A is connected to the bore 24 via a port 25 between the plunger 22 and the valve member 23. A port 26 in the base of the cup-shaped valve member 23 controls the flow of liquid under pressure through the flow limiting portion of the combined valve 20 to the suspension control valve 21 via the outlet port 20A of the combined valve 20 and maintains the rate of flow substantially constant. Normally the bore 24 is isolated from the interior of the reservoir 18. However an excessive pump output pressure results initially in the flow limiting valve member 23 being moved away from the plunger 22 against the action of a light spring 27 so as to uncover a port 28 and place that part of the bore 24 upstream of the valve member 23 in communication with the reservoir 18. A further pressure build-up in the bore 24 urges the plunger 22 away from the valve member 23 against the action of a heavier spring 29, so as to open another port 30 which communicates with the interior of the reservoir 18.

The control valve 21 (See FIG. 5) comprises a valve body 31 and a spool 32 which slides in a through bore 33 in the valve 31. The spool 32, which is longer than the through bore 33 and projects outwardly from both ends thereof, is connected by a suitable linkage to the axle 11A of the vehicle, the linkage including a resilient line 34 (See FIG. 1). Referring again to FIG. 5, each end of the spool 32 is fixed to the radially inner periphery of a respective annular diaphragm 35 and 36 of flexible material. The radially outer periphery of each of the annular diaphragms 35 and 36 is connected to the valve body 31 so that one variable volume chamber 37 of annular cross-section is formed at one end of the valve body 31 between the valve body 31 and the diaphragm 35 and another variable volume chamber 38 of annular cross-section is formed at the other end of the valve body 31 between the valve body 31 and the diaphragm 36.

A space 39 in the valve body 31 communicates with each of the variable volume chambers 37 and 38 through a respective restriction 40, 41 and is connected to the reservoir 18. Two axially spaced annular recesses 42 and 43 are formed in the through bore 33. The recess 42 is in communication with the outlet port 20A of the combined overload relief and flow limiting spool valve 20. The recess 43 is in communication with the reservoir 18 via the space 39. The non-return inlet ball valves 44 and 45 are housed in the valve body 31. The inlet ports of the two inlet ball valves 44 and 45 are connected in parallel to the annular recess 42. The outlet port of the non-return inlet ball valve 44 is in communication with the port 15 of the telescopic strut 10A. The outlet port of the non-return inlet ball valve 45 is in communication with the port 15 of the telescopic strut 10B.

An axial passage 46 having end portions of reduced dimensions interconnects the inlet ports of two non-return ball valves 47 and 48 housed in the spool 32. The outlet port of the ball valve 47 opens into the variable volume chamber 37. The outlet port of the ball valve 48 opens into the variable volume chamber 38. Two axially spaced annular grooves 49 and 50 are defined in the outer surface of the spool 32. The position of the two grooves 49 and 50 is such that both are closed by the valve body 31 when the spool 32 is located symmetrically within the valve body 31, and so that as soon as the valve spool 32 is moved from that position towards one of the variable volume chambers 37 and 38, the respective groove 49 and 50 opens into that chamber 37 or 38. Each groove 49, 50 is connected to the adjacent reduced end portion of the axial passage 46 by respective radial passages 51 or 52. The axial passage 46 communicates with the annular recess 43 via a radial passage 53 in the valve spool 32. An elongated annular groove 54 in the valve spool 32 between the annular groove 49 and the radial passage 53 interconnects the annular recesses 42 and 43 when the spool 32 is located symmetrically within the valve body 31. The axial length of the annular groove 54 is such that communication between the two annular recesses 42 and 43 is interrupted by movement of the valve spool 32 from its central position towards one of the variable volume chambers 37 and 38. A fourth annular groove 55 is formed in the valve spool 32 between the radial passage 53 and the annular groove 50. The position of the fourth annular groove 55 is such that it is isolated from the annular groove 43 when the spool 32 is located symmetrically within the valve body 31, and so that it is placed in communication with the annular groove 43 (and thus with the reservoir 18) by movement of the valve spool 32 towards the variable volume chamber 37.

Two non-return outlet ball valves 56 and 57 are housed in the valve body 31. The inlet port of the outlet ball valve 56 is in communication with the port 15 of the telescopic strut 10A. The inlet port of the outlet ball valve 57 is in communication with the port 15 of the telescopic strut 10B. The outlet ports of the two outlet ball valves 56 and 57 are in permanent communication with the annular groove 55 via a passage 58.

The telescopic struts 10A and 10B of the suspension system may be arranged to provide total support for the vehicle body 11 relative to the axle 11A, or may be employed in combination with conventional suspension springs.

In use of the vehicle suspension system, the spool 32 of the control valve 21 is located symmetrically within the valve body 31 by the combined action of the resilient link and counteracting resilient means 34A when the vehicle body 11 is at the desired level relative to the axle 11A of the vehicle. When the engine of the vehicle is started, the pump 19 is driven to draw liquid from the reservoir 18 and feed it under pressure to the combined overload relief and flow limiting spill valve 20. Liquid under pressure emerges from the combined overload relief and flow limiting spill valve 20 at a constant rate of flow and is directed to the annular recess 42. Providing that the spool 32 is located symmetrically within the valve body 31, the liquid fed to the annular recess 42 is returned to the reservoir 18 via the elongated annular groove 54 and the annular recess 43. Thus the pressure of liquid at the inlet ports of the two non-return inlet ball valves 44 and 45 is insufficient to overcome the spring loading on the ball of each of the two non-return inlet ball valves 44 and 45 so that the balls remain seated and no liquid is transmitted to the respective struts 10A and 10B.

If the loading of the vehicle is increased, the body moves down relative to the axle and the spool 32 is moved to interrrupt the communication between the annular recess 42 and the elongate annular groove, and to place the annular groove 50 in communication with the variable volume chamber 38. Thus the connection between the output of the combined overload relief and flow limiting valve 20 and the reservoir 18 is interrupted. In consequence pressure of liquid at the inlet ports of the non-return inlet ball valves 44 and 45 increases, the balls are lifted off their seats and liquid under pressure is fed to the two telescopic struts 10A and 10B to increase the pressure of liquid within the two telescopic struts 10A and 10B and raise the vehicle body 11 relative to the axle 11A. When the body 11 is raised to the desired level relative to the axle 11A, the spool 32 is returned to the position in which it is located symmetrically within the valve body 31, so that the liquid supply is reconnected to the reservoir via the annular recesses 42 and 43 and the elongated annular groove 54, the pressure at the inlet ports of the two non-return inlet ball valves 44 and 45 is relieved and the balls seat to lock the liquid within the two telescopic struts 10A and 10B.

Liquid passed through the two non-return inlet ball valves 44 and 45 is not exhausted through the two non-return outlet ball valves 56 and 57 because the annular groove 55 downstream of the two non-return outlet ball valves 56 and 57 is isolated from the reservoir 18.

If the loading of the vehicle is decreased, the body moves up relative to the axle and the spool 32 is moved to connect the annular groove 55 to the annular recess 43 and to place the annular groove 49 in communication with the variable volume chamber 37. Thus the outlet ports of the two outlet ball valves 56 and 57 are placed in communication with the reservoir 18 so that the balls of the two outlet ball valves 56 and 57 are lifted off their seats and liquid is exhausted from the two telescopic struts 10A and 10B to reduce the pressure of liquid within the two telescopic struts 10A and 10B and lower the vehicle body 11 relative to the axle 11A. It will be noted that communication between the annular recesses 42 and 43 is interrupted. The resultant flow of liquid through the two non-return inlet ball valves 44 and 45 is returned to the reservoir 18 through the two non-return outlet ball valves 56 and 57. When the body is lowered to the desired level relative to the axles, the spool 32 is returned to the position in which it is located symmetrically within the valve body 31. Thus the liquid supply is reconnected to the reservoir via the annular recesses 42 and 43 and the elongated annular groove 54, the annular groove 55 is isolated from the annular recess 43, the pressure at the inlet ports of the two non-return inlet ball valves 44 and 45 is relieved, the pressure downstream of the two non-return outlet ball valves 56 and 57 is built up, and the balls of the ball valves 44, 45, 56 and 57 are all reseated to lock the liquid within the two telescopic struts 10A and 10B.

In order to avoid operating the control valve 21 to increase the pressure of liquid within the telescopic struts 10A and 10B or to drain liquid from the telescopic struts 10A and 10B in response to changes in the position of the axle 11A relative to the vehicle body 11 which are established for periods of short duration as a result of variations in road surface, the control valve 21 includes means for damping movement of the spool 32 relative to the valve body 31 away from the position in which it is located symmetrically within the valve body, the damping means allowing relatively free return movement of the spool back to the position in which it is located symmetrically within the valve body 31. Operation of the damping means will be described now.

If the wheels of the vehicle drop relative to the vehicle body 11 from their desired position relative to the vehicle body 11, the spool 32 moves to place the annular groove 49 in communication with the variable volume chamber 37 so that the variable volume chamber 37 is in free communication with the reservoir 18. The volume of the variable volume chamber 38 is reduced and the displaced liquid is forced through the restriction 41 to the reservoir 18. It will be understood that the rate of such movement of the spool 32 depends upon the rate at which liquid can be forced through the restriction 41 which provides the required damping. Thus such movement of the spool 32 is slow. Subsequent movement of the spool 32 back to the position in which it is positioned symmetrically within the valve body 32 is relatively unhindered because liquid forced out of the variable volume chamber 37 as its volume is reduced passes relatively freely to the reservoir 18 through the annular groove 49, the radial passage 51, the axial passage 46, the radial passage 53 and the annular recess 43. As the volume of the variable volume chamber 38 increases with such return movement of the spool 32, liquid passes into it from the axial passage 46 via the non-return ball valve 48. It will be understood that the valve 21 operates similarly, but in the opposite sense, if the wheels of the vehicle rise relative to the vehicle body 11 from the desired position relative to the vehicle body 11.

If desired the portions of reduced dimensions at the ends of the axial passage 46 may be arranged to serve as restrictions restricting the flow of liquid from the variable volume chambers 37 and 38 back into the axial passage 46 so that some degree of damping of the return movement of the spool 32 to the position in which it is positioned symmetrically within the valve body 31 is provided. The dimensions of the restrictions 40 and 41 may be different so that the degree of damping provided when the wheels drop from the desired position relative to the vehicle body 11 can differ from the degree of damping provided when the wheels rise from the desired position relative to the vehicle body 11 if such differences are desired.

The arrangement of the non-return inlet ball valves 44 and 45 and the arrangement of the non-return outlet ball valves 56 and 57 ensures that cross flow of liquid from the interior of one of the struts 10A and 10B to the interior of the other is prevented at all times so that pitching and rolling of the vehicle body 11 can be resisted by the struts 10A and 10B. For example roll of the vehicle body 11 during cornering of the vehicle will be opposed by the struts 10A and 10B.

Provision of the flow limiting spill valve 23 enables the supply of liquid to the control valve 21 to be kept substantially constant and not to reflect the considerable variations in pump output which follow from the considerable variation of pump speed, over a wide range of an engine driven pump. The pump 19 may be driven by the engine crankshaft or may be belt driven by the engine. The control valve 21 enables the pump 19 to operate continuously circulating liquid at low pressure when a supply of liquid under pressure is not required to increase the length of the struts 10A and 10B.

Figure 6:
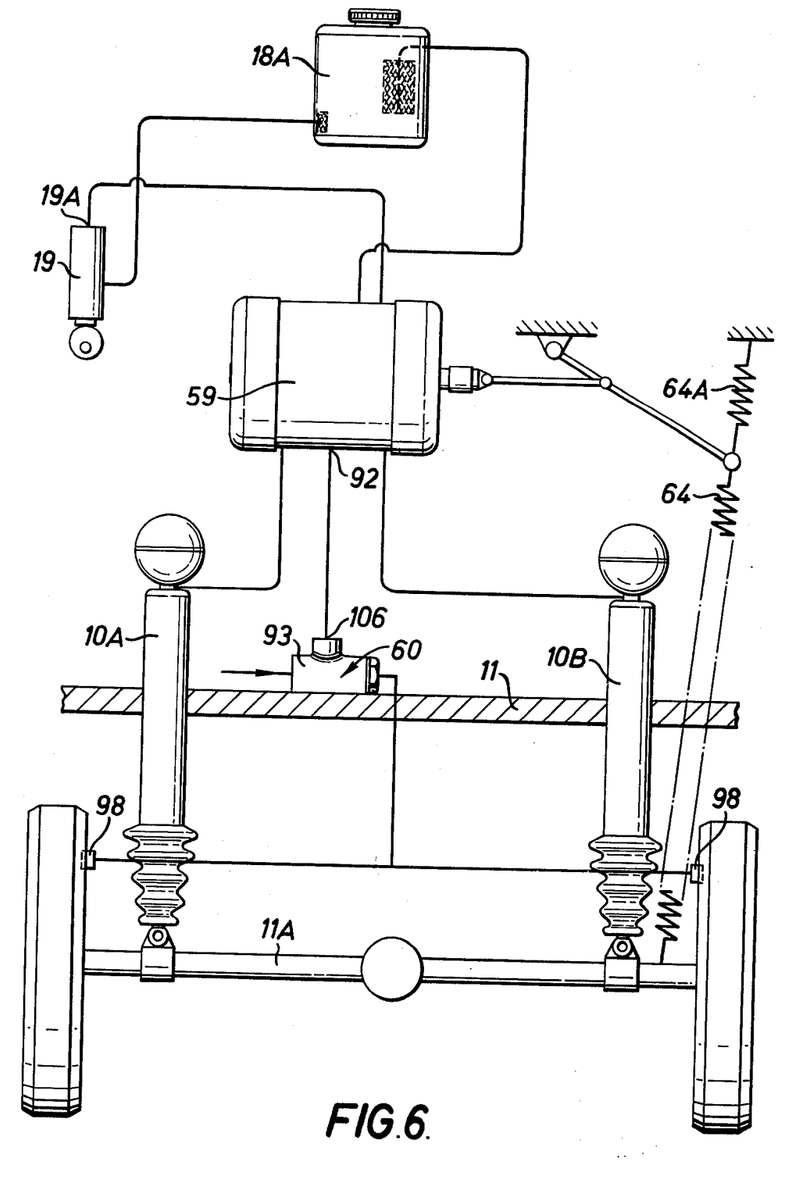
FIG. 6 is a diagram similar to FIG. 1 illustrating another form of vehicle suspension system according to this invention.

Referring now to FIG. 6, there is illustrated a modified form of the vehicle suspension system described above with reference to FIGS. 1–5, which includes a modified reservoir 18A (shown in section in FIG. 6) that does not include a combined overload relief and flow limiting spill valve, and a modified control valve 59 (see FIG. 7) which is associated with a valve 60 (See FIG. 8) that controls the pressure of liquid supplied to the rear brakes of the vehicle to apply those brakes. The other parts of the suspension system are similar to the corresponding parts of the system described above with reference to FIGS. 1–5. Conveniently the axle 11A is the rear axle of the vehicle.

Figure 7:
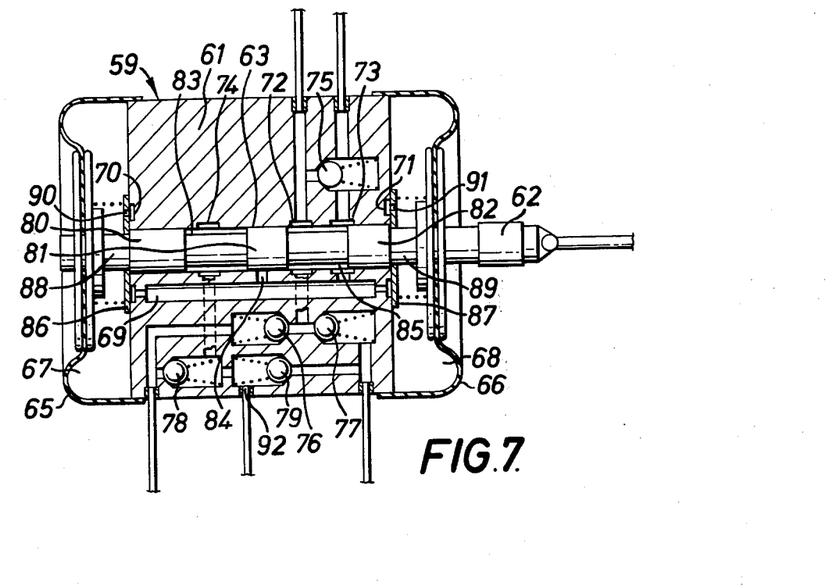
FIG. 7 is a sectional view of the control valve of the vehicle suspension system illustrated in FIG. 6.

Referring now to FIG. 7, the control valve 59 comprises a valve body 61 and a spool 62 which slides in a through bore 63 in the valve body 61. The spool 62, which is longer than the through bore 63 and projects outwardly from both ends thereof, is connected to the rear axle 11A by a suitable linkage including a resilient link 64 (See FIG. 6). Counteracting resilient means 64A cooperate with the resilient line 64 to locate the spool 62 symmetrically within the valve body 61 when the vehicle body 11 is at the desired height relative to the axle of the vehicle. Referring again to FIG. 7, each end of the spool 62 is fixed to the radially inner periphery of a respective annular diaphragm 65 and 66 of flexible material. The radially outer periphery of each of the annular diaphragm 65 and 66 is connected to the valve body 61 so that one variable volume chamber 67 of annular cross-section is formed at one end of the valve body 61 between the valve 61 and the diaphragm 65 and another variable volume chamber 68 of annular cross-section is formed at the other end of the valve body 61 between the valve body 61 and the diaphragm 66.

A cylindrical space 69 in the valve body 61 communicates at each end with a respective annular groove 70, 71 in the respective end wall of the valve body 61. Three axially spaced annular recesses 72, 73 and 74 are formed in the through bore 63. The recess 72 is in direct communication with the pump output 19A. The recess 73 is in communication with the reservoir 18A and the cylindrical space 69. A non-return valve 75 in the body 61 has its inlet port in communication with the conduit which connects the recess 72 to the pump outlet 19A, its outlet port in communication with the conduit which connects the recess 73 to the reservoir, and serves as an overload relief valve.

Two non-return inlet ball valves 76 and 77 are housed in the valve body 61. The inlet ports of the two inlet ball valves 76 and 77 are connected in parallel to the annular recess 72. The outlet port of the non-return inlet ball valve 76 is in communication with the port 15 of the telescopic strut 10A. The outlet port of the non-return inlet ball valve 77 is in communication with the port 15 of the telescopic strut 10B.

Two non-return outlet ball valves 78 and 79 are housed in the valve body 61. The inlet port of the outlet ball valve 78 is in communication with the port 15 of the telescopic strut 10A. The inlet port of the outlet ball valve 79 is in communication with the port 15 of the telescopic strut 10B. The outlet ports of the two outlet ball valves 78 and 79 are in permanent communication with the annular recess 74.

The spool 62 has three axially spaced lands 80, 81 and 82. The annular space 83 between the lands 80 and 81 is arranged to place the annular recess 74 in communication with the cylindrical space 69 via a passage 84 when the spool 62 is moved towards the variable volume chamber 68. The passage 84 is blocked by the land 81 when the spool 62 is located centrally within the valve body 61. The annular space 85 between the lands 81 and 82 places the annular recesses 72 and 73 in communication with one another when the spool 62 is located centrally within the valve body 61, such communication being interrupted when the spool 62 is moved away from that central location in either direction.

The distance between the outer ends of the outer lands 80 and 82 is substantially equal to the length of the valve body 61. The spool 62 carries two annular plate valve members 85 and 87. Each annular plate valve member 86, 87 slides upon a respective reduced diameter portion 88, 89 of the spool 62 within a respective one of the variable volume chambers 67 and 68, the three lands 80, 81 and 82 being formed on that part of the spool 62 which extends between the reduced diameter portions 88 and 89. Each annular plate valve member 86, 87 is urged resiliently towards the valve body 61 and is held thereagainst, covering the mouth of the respective annular groove 70, 71, when the spool 62 is located centrally within the valve body 61. Each annular plate valve 86, 87 has a restricted orifice 90, 91 through which restricted communication between the space 69 and the respective variable volume chamber 67, 68 is established when the plate valve member 86, 87 is held against the valve body 61.

When the loading of the vehicle is increased or decreased, the control valve 59 operates in substantially the same way as the control valve 21 described above with reference to FIGS. 1–5 to either increase or reduce the pressure of liquid within the struts 10A and 10B so as to raise or lower the vehicle body 11 relative to the axle 11A. The control valve 59 also includes means for damping movement of the spool 62 away from the position in which it is located symmetrically within the valve body 61, the damping means allowing relatively free return movement of the spool 62 back to the position in which it is located symmetrically within the valve body 61. Operation of the damping means of the control valve 59 will be described now.

If the wheels of the vehicle drop relative to the vehicle body 11 from their desired position relative to the vehicle body, the spool 62 moves to separate the annular plate valve member 86 from the valve body 61 so that the variable volume chamber 67 is in free communication with the reservoir 18A via the annular groove 70 and the space 69. The volume of the variable volume chamber 68 is reduced and the displaced liquid is forced through the restricted orifice 91 in the annular plate valve member 87 to the reservoir 18A. It will be understood that the rate of movement of the spool 62 depends upon the rate at which liquid can be forced through the restricted orifice 91 which provides the required damping. Thus such movement of the spool 62 is slow. Subsequent movement of the spool 62 back to the position in which it is positioned symmetrically within the valve body 61 is relatively unhindered because liquid forced out of the variable volume chamber 67 as its volume is reduced passses relatively freely through the annular groove 70 to the space 69, the annular plate valve member 86 being held spaced from the valve body 61 by the adjacent land 80 until the spool 62 returns to its central location within the valve body 61. As the volume of the variable volume chamber 68 increases with such return movement of the spool 62, liquid passes into it from the space 69, the annular plate valve member 87 being displaced from engagement with the valve body 61 by the flow of such liquid. It will be understood that the valve 21 operates similarly, but in the opposite sense, if the wheels of the vehicle body 11 rise relative to that vehicle body 11 from the desired position relative to the vehicle body 11.

The outlet ports of the two outlet ball valves 78 and 79 are in communication also, via a port 92 in the valve body 61, with the valve 60.

Figure 8:
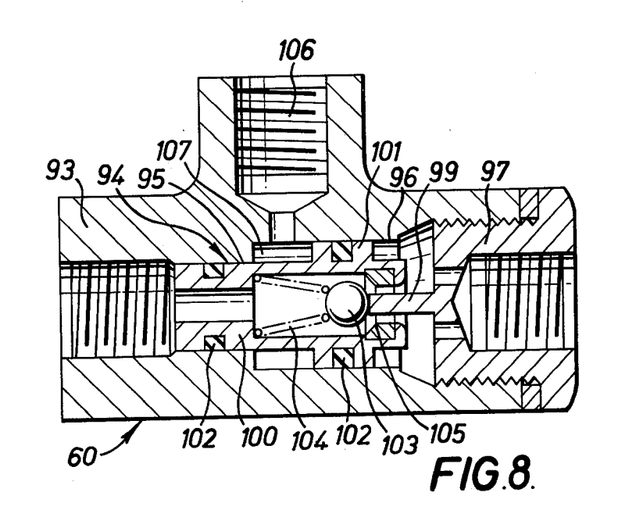
FIG. 8 is a sectional view of a brake pressure control valve associated with the vehicle suspension system illustrated in FIG. 1.

Referring now to FIG. 8, a suitable form of valve 60 has a valve body 93 which, as shown diagrammatically in FIG. 6, is mounted on the vehicle body 11. A stepped through bore 94 is formed in the valve body 93, the stepped through bore 94 having a portion 95 at one end of smaller diameter and a portion 96 at the other end of a larger diameter. The end of the bore portion 95 is connected to the usual driver operable device (not shown) for supplying hydraulic fluid under pressure to apply the brakes of the vehicle. A plug 97, which closes the end of the bore portion 96, is formed with apertures to allow liquid from that end of the through bore 94 to pass to the liquid pressure motor cylinders 98 (See FIG. 6) which are arranged to operate brakes on the rear wheels of the vehicle. A pin 99 carried by the plug 97 projects into the bore portion 96.

A tubular plunger 100 slidable in the through bore 94 has one end thereof fitting slidably in the bore portion 95, and has an enlargement 101 fitting slidably in the bore portion 96. Packing rings 102 are provided on the enlargement 101 and on the smaller end of the plunger 100 within the bore portion 95. A ball 103, urged by a spring 104 towards a seat 105 in the bore of the tubular plunger 100, is held off that seat 105 under certain conditions by the pin 99 to provide a free passage through the through bore 94 for liquid in the braking system.

A port 106 in the valve body 93 communicates with the annular space 107 between the enlargement 101 and the shoulder between the two portions 95 and 96 of the through bore 94, and is connected to the port 92 of the control valve 59.

It will be observed that liquid pressure acting in the motor cylinders 98 of the braking system will act on the full area of the plunger 100 exposed in the bore portion 96, and liquid pressure acting in the struts 10A and 10B will act in the annular space 107. Thus for any given pressure acting in the struts 10A and 10B there will be a value of liquid pressure acting in the brake motor cylinders 98 at which the said last mentioned liquid pressure will be sufficient to move the plunger towards the smaller diameter bore portion 95, allowing the ball 103 to seat and prevent further increase of pressure in the brake motor cylinder. Thus the maximum degree of braking which can be obtained depends on the liquid pressure in the struts 10A and 10B, and so depends on the loading of the vehicle.

Figure 9:
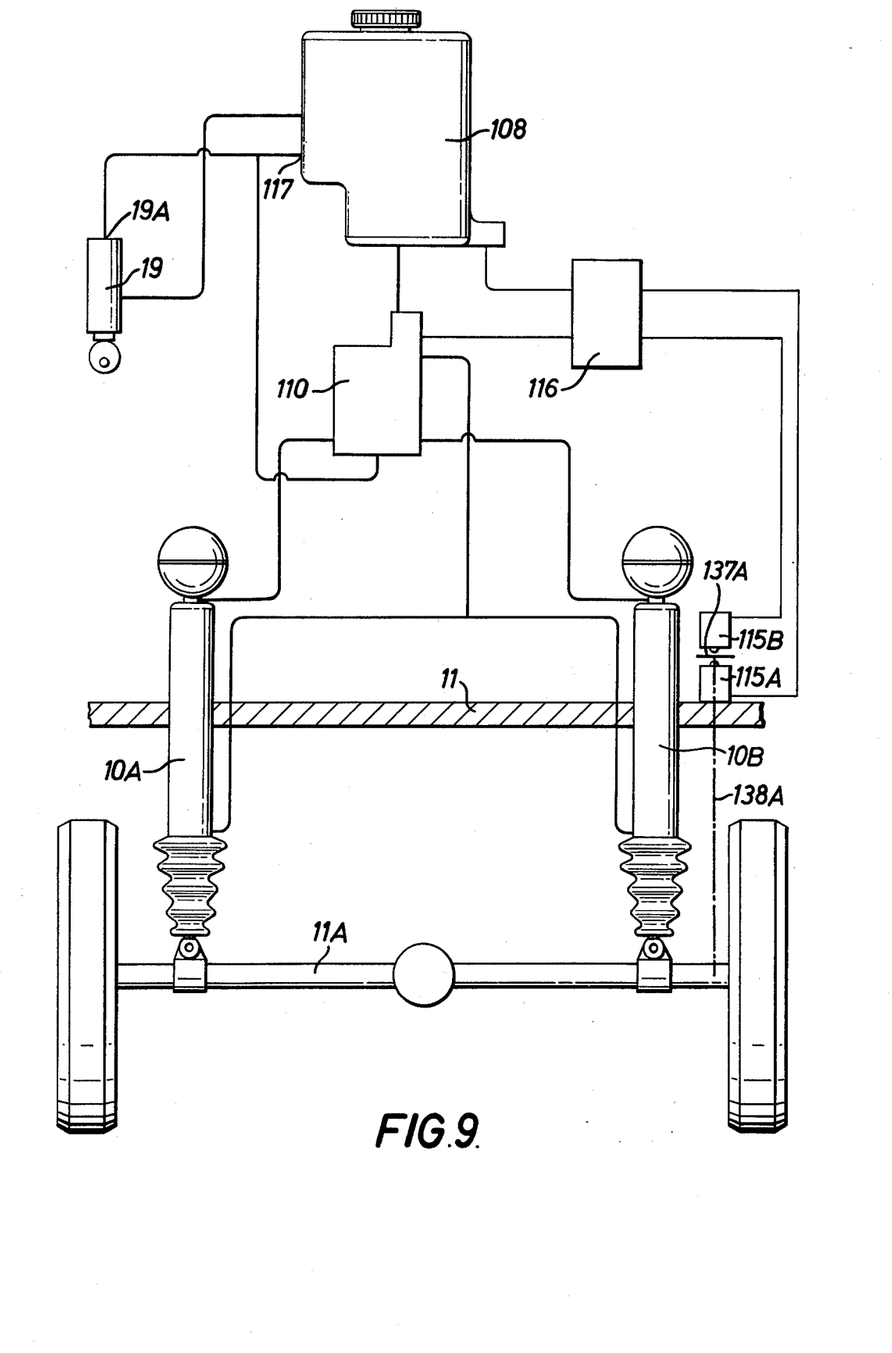
FIG. 9 is a diagram illustrating yet another form of vehicle suspension system according to this invention.

Referring to FIG. 9, there is illustrated diagrammatically another form of vehicle suspension system according to this invention. Parts of the vehicle suspension system illustrated in FIG. 9 which are constructed similarly and which serve the same purpose as parts of the vehicle suspension system of FIG. 1 have been given the same references as the corresponding parts of the vehicle suspension system illustrated in FIG. 1.

The vehicle suspension system includes a reservoir 108, a valve device 109 (See FIG. 10) which is housed in a common housing with the reservoir 108; a valve block 110 (See FIG. 11) for the two non-return inlet ball valves 111 and 112, and for the two non-return outlet ball valves 113 and 114; and electronic apparatus including means for sensing the height of the vehicle body 11 relative to the axle 11A, and a control module 116 arranged to provide the required signal damping.

The inlet port 117 of the valve device 109 and the inlet ports of the two non-return inlet ball valves 111 and 112 are connected in parallel to the outlet port 19A of the pump 19.

Referring now to FIG. 10, the valve device 109 comprises a piston 118 slidable in a cylindrical chamber 119 and carrying an axially extending plunger 120 which is a close sliding fit in a bore 121 which opens into the chamber 119. The inlet port 117 opens into the end of the bore 121 furthest from the cylindrical chamber 119. The plunger 120 has a radial passage 122 at its end remote from the piston 118. The piston 118 has an abutment 123 on its face remote from the plunger 120. When the abutment 123 abuts the end wall of the cylindrical chamber 119 further from the bore 121, the cylindrical space 124 between the piston 118 and the said end wall is annular and the end of the plunger 120 remote from the piston 118 is positioned within a larger diameter central bore portion 125, of the bore 121, the radial passage 122 opening into the bore portion 125. The cylinder space 126, on the opposite side of the piston 118 from the cylinder space 124 is in communication with the reservoir 108. A non-return type ball valve 127 having two outlet ports 128 and 129 is housed within the piston 118. The outlet ports 128 and 129 of the valve 127 open into the cylinder space 126, and the inlet port of the valve 127 is in communication with the radial passage 122 via an axial passage 130 in the plunger 120. A restriction 131 in the piston 118 places the cylinder spaces 124 and 126 in direct restricted communication with one another. A passage 132 places the larger diameter bore portion 125 is communication with the cylinder space 124. The passage 132 is closed by a solenoid valve 133 normally and is opened to allow flow from the bore 121 to the cylinder space 124 when the solenoid winding 134 of the solenoid valve 133 is energised.

Referring now to FIG. 11, communication of the outlet ports of the two non-return outlet ball valves 113 and 114 with the reservoir 108 is controlled by a second solenoid valve 135 which normally prevents such communication and which permits it when its solenoid winding 136 is energised. The inlet ports of the two inlet non-return valves 111 and 112 are connected to the pump outlet 19A via a port 137 in the valve block 110. Due to the spring loading of its movable valve member, the solenoid valve 133 may function also as an overload relief valve for the pump 19.

The solenoid windings 134 and 136 of the solenoid valves 133 and 135 are energised by signals from the control module 116 in a manner which is described below and in response to changes in the height of the vehicle body 11 relative to the vehicle wheels. It will be appreciated that the valve device 109 and the valve block 119 together correspond to the control valves of the two other suspension systems described hereinbefore.

Figure 12:
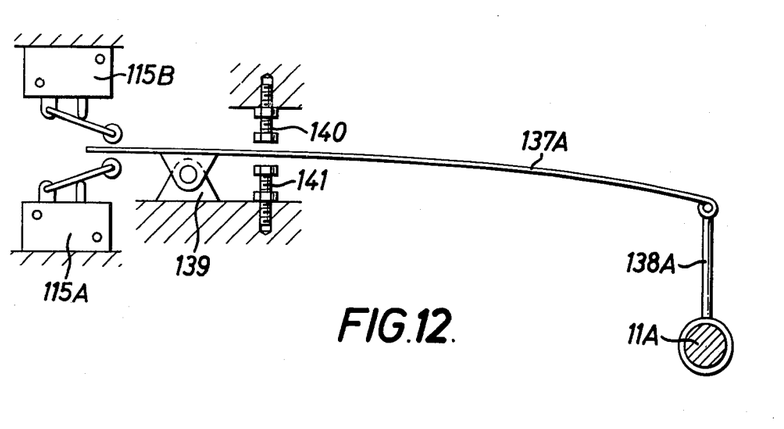
FIG. 12 shows apparatus incorporated in the vehicle suspension system illustrated in FIG. 6 for sensing the height of the vehicle body relative to an axle of the vehicle.

Referring now to FIGS. 10 and 12, the means for sensing the height of the vehicle body 11 relative to the axle 11A includes a leaf spring 137A which is hinged at one end to a post 138A that projects upwards from the axle 11A and which has its other end projecting between the actuator arms of a pair of microswitches 115A and 115B that are fixed to the vehicle body 11. The leaf spring 137A is pinned, intermediate its ends, to a pivot bracket 139 which is fixed to the vehicle body 11. That part of the leaf spring 137A between the post 138A and the fixed pivot bracket 139 extends between a spaced pair of adjustable stops 140 and 141 fixed to the vehicle body 11, the stops 140 and 141 ensuring that the leaf spring 137A does not exert an excessive load upon the microswitches 115A and 115B. Each microswitch 115A and 115B comprises a double pole change over switch, that is in one condition when the leaf spring 137A is spaced from its actuator arm and which is switched to its other condition when its actuator arm is deflected by the leaf spring 137A. The leaf spring 137A is equi-spaced from the actuator arms of both microswitches 115A and 115B when the vehicle body 11 is at the desired level relative to the axle 11A of the vehicle.

Figure 13:
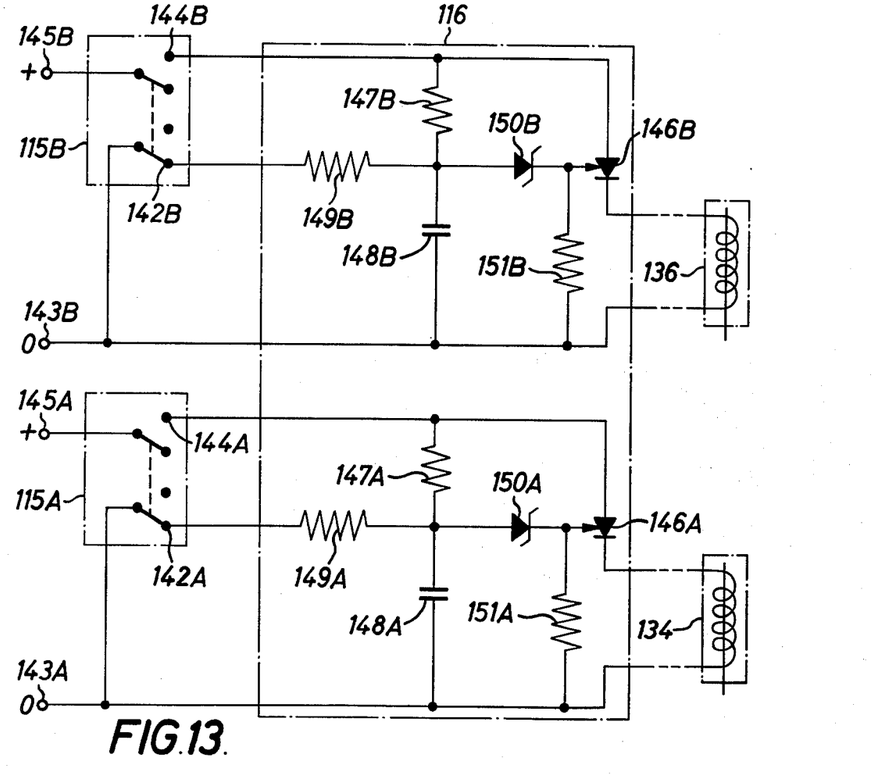
FIG. 13 is an electrical circuit which is incorporated in the vehicle suspension system illustrated in FIG. 6.

FIG. 13 shows the electronic circuit of the control module 116 by which the microswitches 115A and 115B are connected to the respective solenoid windings 134 and 136 of the solenoid valves 133 and 135. When in said one condition, each microswitch 115A, 115B connects one terminal 142A, 142B to an earth terminal 143A, 143B. When in said other condition, each microswitch 115A, 115B connects another terminal 144A, 144B to a power terminal 145A, 145B which is connected to a battery of the vehicle.

The control module 116 includes two silicon controlled rectifiers 146A, 146B each of which is connected in series between the respective terminal 144A, 144B and the respective solenoid winding 134 and 136 of the solenoid valves 133 and 135, the other end of each solenoid winding 134, 136 being connected to the respective earth terminal 143A, 143B. A series circuit comprising a resistor 147A, 147B and a capacitor 148A, 148B is connected in parallel with the respective rectifier 146A, 146B and solenoid winding 134, 136, the resistor 147A, 147B being connected across the terminals 142A, 142B and 144A, 144B and the capacitor 148A, 148B being connected across the terminals 142A, 142B and 143A, 143B. A resistor 149A, 149B, having a low ohmic value compared with that of the respective resistor 147A, 147B is connected to the respective terminal 142A, 142B and to a connection in the series circuit between the respective resistor 147A, 147B and capacitor 148A, 148B. A zener diode 150A, 150B, in series with the respective low ohmic value resistor 149A, 149B is arranged to provide a trigger voltage for the respective silicon controlled rectifier 146A, 146B. A third resistor 151A, 151B connected between the zener diode 150A, 150B and the rectifier 146A, 146B, is connected across the terminals 142A, 142B and 143A, 143B is parallel with the respective capacitor 148A, 148B.

In use of the vehicle suspension system illustrated in FIGS. 9 – 13, the piston 118 is positioned with its abutment 123 in abutment with the end wall of the cylindrical housing 119 remote from the bore 121 when the vehicle body 11 is at the desired level relative to the axle 11A the two microswitches 115A and 115B being said one condition so that the solenoid windings 134 and 136 of the two solenoid valves 133 and 135 are deenergised.

Liquid fed by the pump 19 to the inlet port 117 acts on the free end of the plunger 120 to hold the piston 118 in position and flows from the larger diameter bore portion 125 through the radial passage 122 and the axial passage 130 to the non-return ball valve 127. The ball of the valve 127 is urged off its seat and the liquid passes to the reservoir 108. Thus the pressure of liquid at the inlet ports of the two non-return inlet ball valves 111 and 112 is insufficient to open these valves.

If the loading of the vehicle is increased, the microswitch 115A is switched to said other condition by the leaf spring 137A. Current flows from the vehicle battery through the high ohmic value resistor 147A and changes the capacitor 148A. The volt drop across the capacitor 148A, rises until it reaches the voltage at which the zener diode 150A begins to conduct current towards the third resistor 151A. When the volt drop across the third resistor 151A reaches the voltage required to trigger the silicon controlled rectifier 146A current flows through the rectifier 146A and energises the solenoid winding 134 of the solenoid valve 133 to open the solenoid valve 133. Thus liquid from the pump 19 is fed through the passage 138 to the cylinder space 124. The piston 118 is moved towards the bore 121 until communication between the inlet port 117 and the larger diameter bore portion 125 is restricted, whereupon the pressure of liquid at the inlet port 117, and thus the pressure at the inlet ports of the two non-return inlet ball valves 111 and 112, is increased to a pressure determined by the pressure acting in the cylinder space 124 and the pressure at the inlet port 117 which acts upon the end of the plunger 120. When the vehicle body 11 reaches the desired level the leaf spring 137A disengages from the actuator arm of the microswitch 115A so that the microswitch 115A returns to said one condition thus disconnecting the solenoid winding 134 of the solenoid valve 133 from the vehicle battery so that it is deenergised.

When the microswitch 115A is restored to said one condition, the capacitor 148A is discharged via the low ohmic value resistor 149A. Thus the rate at which the capacitor 148A discharges is greater than the rate at which it is charged up. It is this feature which provides the signal damping required to avoid unnecessary operation of the control valve 109 as a result of variations in the road surface.

If the loading of the vehicle is decreased, the microswitch 115B is switched to said other condition by the leaf spring 137A so that the solenoid winding 136 of the solenoid valve 135 is energised and the solenoid valve 135 opened. Opening of the solenoid valve 135 allows liquid to be exhausted from the two struts 10A and 10B through the two non-return outlet ball valves 113 and 114. When the vehicle body 11 reaches the desired level the solenoid winding 136 of the solenoid valve 135 is deenergised and the solenoid valve 135 closed. Operation of the control module 116 to energise and deenergise the solenoid winding 136 will be understood from the foregoing description of the energisation and deenergisation of the solenoid winding 134.

An analogue device, such as resistive, inductive or capacitive travel transducer, may be employed for sensing the height of the vehicle body 11 relative to the axle 11A instead of the arrangement described above with reference to FIG. 12 of the accompanying drawings.

The vehicle suspension system described above with reference to and illustrated in FIGS. 9–13 may be modified by substitution of solenoid valves for the two non-return outlet ball valves 113 and 114, in which case the solenoid valve 135 may be dispensed with. The two outlet solenoid valves would be actuated by the control signal which actuates the solenoid valve 135.

Whilst the diagrams (FIGS. 1, 6 and 9) illustrating each embodiment show a pair of wheels mounted on an axle 11A the present invention may be utilised in vehicles having independent suspension means associated with each wheel thereof, the struts 10A and 10B being arranged between the vehicle structure and a wheel support carrying one of the wheels. The valve spool of the control valve 29 or 59 would be connected to a bar extending between a coaxial pair of wheel supports.

We claim:

1. A vehicle suspension system including two telescopic struts comprising one strut element for connection to a respective axle of the vehicle and another strut element for connection to the body of the vehicle, a liquid reservoir, a liquid pump arranged to draw liquid from the liquid reservoir and to feed it under pressure through one non-return valve to the interior of one of the telescopic struts and through another non-return valve to the interior of the other of the telescopic struts, and a control valve operable in accordance with relative movement between an axle and the body of the vehicle, the control valve, which connects the pump output to the reservoir normally, being disposed to increase the pressure of liquid supplied by the pump to the non-return valves when the loading of the vehicle is increased so that liquid under the increased pressure is fed through the non-return valves to the interior of the telescopic struts, and to place the interior of the telescopic struts in communication with the reservoir when the loading of the vehicle is decreased, so that liquid is discharged from the telescopic struts, said pump being disposed to supply liquid to each non-return valve through said control valve, the said control valve having a valve spool coupled to an axle of the vehicle and slidable in a bore in a valve body which is fixed to the vehicle body, and including damping means incorporated in the control valve, the damping means being arranged to damp movement of the valve spool away from the normal position in which it connects pump output to the reservoir, the arrangement being such that return movement of the valve spool to the normal position is relatively free, said bore being a through bore and said valve spool is longer than said bore, each end of said valve spool being fixed to a respective movable wall, and each movable wall and the adjacent end of said valve body comprising opposite walls of a respective variable volume chamber which is in restricted communication with the reservoir at least when said valve spool is in the said normal position, or is moved theretowards from said normal position.

2. A vehicle suspension system including two telescopic struts, each telescopic strut comprising one strut element for connection to a respective axle of the vehicle and another strut element for connection to the body of the vehicle, a liquid reservoir, a liquid pump having an inlet and an outlet, an inlet conduit which connects the pump inlet to the liquid reservoir to flow liquid from said reservoir to the pump inlet, conduit means connecting said pump outlet through one non-return valve to the interior of one telescopic strut and through another non-return to the interior of the other telescopic strut, return conduit means connecting a part of said conduit means between the pump outlet and said non-return valves to said reservoir, a control valve for controling liquid flow through said return conduit means, and means sensitive to relative movement between an axle and the body of the vehicle and arranged to control operation of the control valve in accordance with such relative movement, the control valve, which connects the pump output to the reservoir normally, being arranged to increase the pressure of liquid supplied by the pump to the non-return valve accordance with such relative movement, the control valve, which connects the pump output to the reservoir normally, being arranged to increase the pressure of liquid supplied by the pump to the non-return valves when the loading of the vehicle is increased so that liquid under the increased pressure is fed through said non-return valves to the interior of the telescopic struts, and to place the interior of the telescopic struts in communication with the reservoir when the loading of the vehicle is decreased, so that liquid is discharged from the telescopic struts, wherein the improvement comprises said non-return valves and further valve means in the conduits by which the interiors of the telescopic struts are connected to the reservoir isolate the interiors of the two telescopic struts one from the other, and damping means damp control valve operating signals induced by movement of the respective axle relative to the vehicle body due to road surface variations so that the control valve is not operated to feed liquid to each telescopic strut nor to drain liquid from each telescopic strut in accordance with such axle movement.

3. A vehicle suspension system as claimed in claim 2, wherein the pump is arranged to supply liquid to each non-return valve through the control valve.

4. A vehicle suspension system as claimed in claim 3, including damping means for damping control valve operating signals induced by movement of the respective axle relative to the vehicle body due to the road surface variations so that the length of each telescopic strut is not altered in accordance with such axle movement, wherein the control valve comprises a valve member coupled to an axle of the vehicle and movable relative to a valve body which is fixed to the vehicle body, the damping means being incorporated within the control valve and being arranged to damp movement of the valve member away from the normal position in which it connects the pump output to the reservoir, the arrangement being such that return movement of the valve member to the normal position is relatively free.

5. A vehicle suspension system as claimed in claim 4, wherein the damping means are arranged so that return movement of the valve member to the normal position is not damped.

6. A vehicle suspension system as claimed in claim 4, wherein the damping means are arranged so that some degree of damping of return movement of the valve member to the normal position is provided.

7. A vehicle suspension system as clamed in claim 3, wherein the control valve has a valve spool coupled to an axle of the vehicle and slidable in a bore in the valve body which is fixed to the vehicle body, and including damping means incorporated in the control valve, the damping means being arranged to damp movement of the valve spool away from the normal position in which it connects pump output to the reservoir, the arrangement being such that return movement of the valve spool to the normal position is relatively free.

8. A vehicle suspension system as claimed in claim 7, wherein the bore is a through bore and the valve spool is longer than the through bore, each end of the valve spool being fixed to a respective movable wall, and each moveable wall and the adjacent end of the valve body comprising opposite walls of a respective variable volume chamber which is restricted communication with the reservoir at least when the valve spool is in the said normal position, or is moved there-towards from the said normal position.

9. A vehicle suspension system as claimed in claim 2, wherein the valve means comprise two non-return valves.

10. A vehicle suspension system as claimed in claim 2, wherein the pump is driven by an engine of the vehicle.

11. A vehicle suspension system as claimed in claim 1, wherein a plate valve member in each variable volume chamber is held against the valve body when the valve spool is in the said normal position and when the volume of the respective variable volume chamber is being reduced with movement of the valve spool away from the said normal position, each plate valve member having a restricted orifice through which restricted communication between the respective variable volume chamber and the reservoir is established when the plate valve member is held against the valve body, each plate valve member being moved away from the valve body by the valve spool as the valve spool moved away from the said normal position towards the respective variable volume chamber so that the variable volume chamber is placed freely in communication with the reservoir.

* * * * *